United States Patent [19]

Tomita et al.

[11] Patent Number: 4,539,813
[45] Date of Patent: Sep. 10, 1985

[54] EXHAUST SYSTEM CONTROL APPARATUS IN AN INTERNAL COMBUSTION ENGINE

[75] Inventors: Takao Tomita, Niiza; Takumi Tottori, Fujimi; Yasuo Terada, Miyoshi; Hideki Toyota, Fujimi; Masahiro Akiba, Kiyose, all of Japan

[73] Assignee: Honda Giken Kogyo Kabushiki Kaisha, Tokyo, Japan

[21] Appl. No.: 484,883

[22] Filed: Apr. 14, 1983

[30] Foreign Application Priority Data

Apr. 14, 1982 [JP] Japan ............................. 57-53005[U]
Jun. 11, 1982 [JP] Japan ............................. 57-86075[U]

[51] Int. Cl.³ ............................................. F02B 27/02
[52] U.S. Cl. ................................... 60/314; 60/312
[58] Field of Search .......................... 60/312, 313, 314

[56] References Cited

U.S. PATENT DOCUMENTS 3,254,484 6/1966 Kopper ................................. 60/312
3,367,311 2/1968 Tenney ................................. 60/314

FOREIGN PATENT DOCUMENTS 1601350 11/1970 Fed. Rep. of Germany ........ 60/312
112823 9/1980 Japan ..................................... 60/312
55-132321 9/1980 Japan .

Primary Examiner—Douglas Hart
Attorney, Agent, or Firm—Lyon & Lyon

[57] ABSTRACT

An exhaust system control apparatus for the exhaust of an internal combustion engine which is particularly useful on two-cycle engines. The exhaust system includes a subsidiary chamber connected to the normal engine exhaust passage with a valve for opening and closing communication between the chamber and exhaust passage to change the pressure wave at the engine cylinder exhaust port to provide optimum performance at high and low speeds. The chamber valve is operated rapidly by a pneumatic actuator supplied with compressed air from one or more of the sources disclosed, namely, a belt driven or electric air compressor and piston and cylinder devices extending between or forming the suspension components of a two wheeled vehicle. A pneumatic valve is operated by engine speed sensing means to supply or release the pressurized air to the actuator at a predetermined engine speed.

12 Claims, 9 Drawing Figures

EXHAUST SYSTEM CONTROL APPARATUS IN AN INTERNAL COMBUSTION ENGINE

BACKGROUND OF THE INVENTION

1. Field of the Invention

This invention relates to an exhaust system control apparatus in an internal combustion engine, primarily for a vehicle such as a motorized two-wheeled vehicle or the like, which has an exhaust passage extending from an engine main body with a subsidiary chamber which is in communication therewith through a communication passage. The communication passage is provided with an opening and closing valve, wherein the opening and closing valve is arranged to be opened and closed according to a set engine speed.

2. Description of the Prior Art

Prior art engines of this type such as a two-cycle engine or the like have been improved by using the positive pressure of a pulsation wave of a combustion gas reflected from an open end portion of an exhaust pipe in the final stage of an exhaust stroke in a high speed operation. The pulsation wave acts on an exhaust port portion and thereby a mixture gas which has been discharged from a cylinder into the exhaust pipe, by pushing it back to the interior of the cylinder. The engine speed at which the output of the engine can be improved is limited to the high speed range where the exhaust pipe is designed in shape or/and size to comply with a high speed range. Consequently there is a lowering in the output at a low speed operation as a result of the negative pressure of the pulsation wave acting on the exhaust port portion causing the mixture gas in the cylinder to be sucked out.

Accordingly, it has been proposed to provide the exhaust passage with a subsidiary chamber which is in communication therewith through a communication passage. The communication passage is provided with an opening and closing valve which is arranged to be opened at a low speed operation and to be closed at a high speed operation. Thus negative pressure at the exhaust port portion caused by the pulsation wave of the combustion gas in the final stage of the exhaust stroke, that otherwise would be the cause of the lowered output, is changed into a positive pressure by a reflection wave from the subsidiary chamber. Thereby the output of the engine is improved, and at a high speed operation of the subsidiary chamber has no influence and thereby the lowered output is prevented. In this arrangement, such as shown in Japanese Utility Model Application Publication No. 132321/1980, an electric motor is usually used for opening and closing the valve, the electric motor being arranged to be operated by an engine speed detector signal. As a result the changeover operation time for opening or closing of the valve becomes long, and also when engine speed is rapidly changed as in the case of a vehicle engine, the opening or closing of the valve corresponding to the engine speed cannot be effected. Accordingly, excellent output characteristics over the whole range from low speed to high speed cannot be obtained. Additionally, there is the inconveniences of providing electric switches for detecting the position of the opening and closing valve and for stopping the valve; and further, electric power consumption is large.

SUMMARY OF THE INVENTION

It is an object of the present invention to provide a novel exhaust system control apparatus for an internal combustion engine in which a communication passage between an exhaust passage and a subsidiary chamber includes a control valve which is opened and closed in accordance with engine speed.

It is another object of the present invention to provide a pressure source for opening and closing the control valve in accordance with engine speed.

It is still a further object of the present invention to provide a pressure source which comprises an air pump driven by the engine.

It is still another object of the present invention to provide a pressure source which includes the crank chamber of the engine crankcase.

It is still another object of the present invention to provide a pressure source which includes a swingable means mounted on the engine which swings in response to variations in the road surface.

It is still a further object of the present invention to provide a pressure source which comprises part of the vehicle suspension system.

The present invention is directed to an exhaust system control apparatus for an internal combustion engine. The apparatus comprises an exhaust passage extending from the engine, a subsidiary chamber, and a communication passage coupling the exhaust passage and the subsidiary chamber. An opening and closing valve is positioned in the communication passage for opening and closing the passage and thereby communicating and cutting off flow between the exhaust passage and the subsidiary chamber. A pressure driven actuator means is coupled to the valve means for opening and closing the valve means and a pressure source means is coupled to the actuator means for applying pressure to operate the actuator means. A control valve means is coupled between the pressure source means and the actuator means for controlling the application of pressure to the actuator means, the control valve means operating in response to the detection of a predetermined engine speed.

DETAILED DESCRIPTION OF THE PREFERRED EMBODIMENT

Figure 1:
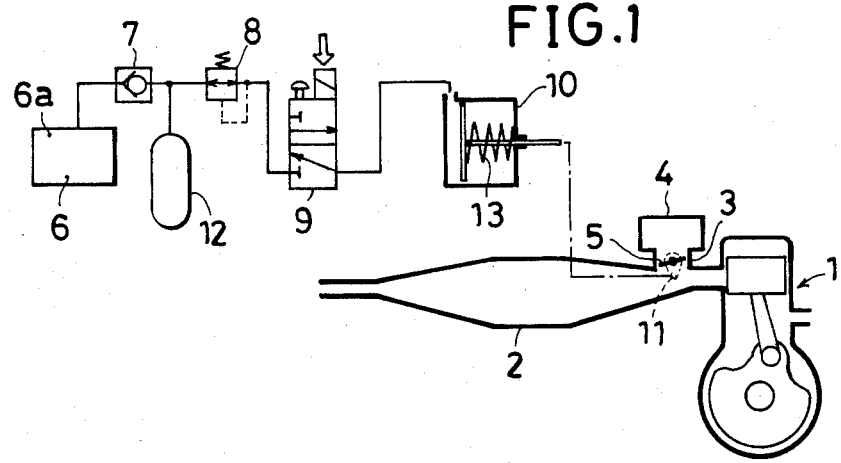
FIG. 1 is a diagram of one embodiment of the present invention.

Referring to FIG. 1 which illustrates one embodiment of the present invention in which an engine main body 1 of a two-cycle internal combustion engine for a vehicle such as a motorized two-wheeled vehicle or the like, has an exhaust passage 2 extending therefrom. The exhaust passage 2 is provided with a subsidiary chamber 4 which is in communication therewith through a communication passage 3, and the communication passage 3 has an opening and closing valve 5. A pressure source 6 comprises an air pump 6a driven, for instance, by the engine main body 1 or an electric motor (not illustrated). Compressed air generated by pressure source 6 is supplied through a check valve 7 and a regulator 8 to a control valve 9 comprising, for example, a three port type electromagnetic valve. An actuator 10 comprises an air cylinder and a diaphragm or the like arranged to be driven by the compressed air from the control valve 9. The actuator 10 is connected through a crank mechanism 11 to the opening and closing valve 5 so that the valve 5 may be opened and closed by the operation of the actuator 10. Numeral 12 denotes an air tank and numeral 13 denotes a return spring of the actuator 10.

Figure 2:
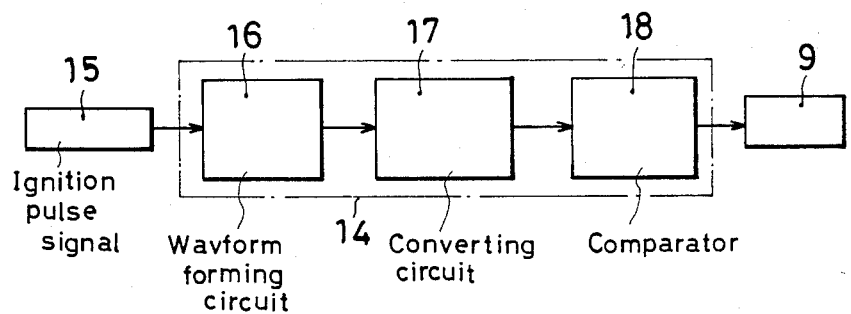
FIG. 2 is a diagram of a control circuit for a control valve thereof.

The control valve 9 is connected to a control circuit 14 as shown in FIG. 2. The control circuit 14 is arranged to receive an engine ignition pulse signal, and comprises a waveform forming circuit 16 for the input signal, a frequency-voltage converting circuit 17 for converting the frequency of the input signal into a voltage of a level corresponding thereto, and a comparator circuit 18 comprising a comparator which determines whether or not the voltage is at a level corresponding to a set engine speed for changeover operation of the opening and closing valve 5. Thus, if the engine speed is increased to a high speed above the set value, the comparator circuit 18 receives a voltage of a level above a predetermined level, and the three port type electromagnetic control valve 9 is operated by the output of the comparator circuit 18 to open a passage connecting the air pump of the pressure source 6 and the actuator 10. The compressed air thus acts on the actuator 10 against the force of the spring 13, and thereby the opening and closing valve 5 connected to the actuator 10 is closed. If the engine speed is a low speed below the set value, the output of the comparator circuit 18 goes to zero, whereby the passage between the air pump 6 and the actuator 10 is closed by the valve 9, and the actuator 10 is returned to its original condition by the action of the return spring 13. This causes the valve 5 to open through the crank mechanism 11.

For preventing a hunting phenomenon near the set value, a circuit for causing a hysteresis may be additionally provided.

Figure 3:
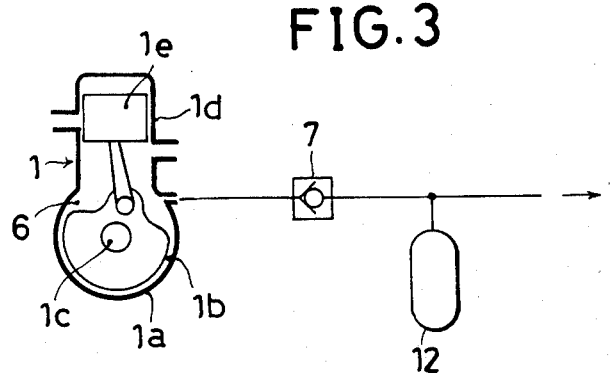
FIG. 3 is a diagram of a portion of another embodiment of the present invention.

FIG. 3 illustrates an embodiment of this invention, wherein the compressed air generated in the crank chamber 1b of a crankcase 1a of the engine main body 1 is utilized as the pressure source 6. This embodiment is advantageous in that the construction is simplified and the weight can be decreased, because the use of an air pump is not required. A crank shaft 1c is provided in the crankcase 1a, and an engine cylinder 1d extends upwards from the crankcase 1a. A piston 1e is mounted therein.

The pressure source 6 is a compressed air type in the foregoing embodiments, but may be of the type using a negative pressure generated in an intake passage of the engine 1.

Thus, according to this invention, the opening and closing valve is moved with the actuator driven by the pressure of the pressure source, and the control valve for controlling the operation of the actuator according to the set engine speed is interposed between the pressure source and the actuator. Thus even when the engine speed is rapidly changed, closing or opening of the valve can sufficiently follow any changing towards a high side or a low side of the engine speed. Accordingly, an excellent output characteristic can be obtained over the whole range from low speed to high speed, and additionally construction is simplified and electric power consumption is decreased.

In a vehicle such as a motorized two-wheeled vehicle or the like, the pressure source 6 may be an air compressor comprising a swingable member, provided on the vehicle body, which has a swinging movement according to the uneven condition of a road surface, and an air cylinder having an internal air chamber arranged to be varied in its volume with the swinging movement of the swingable member.

Figure 4:
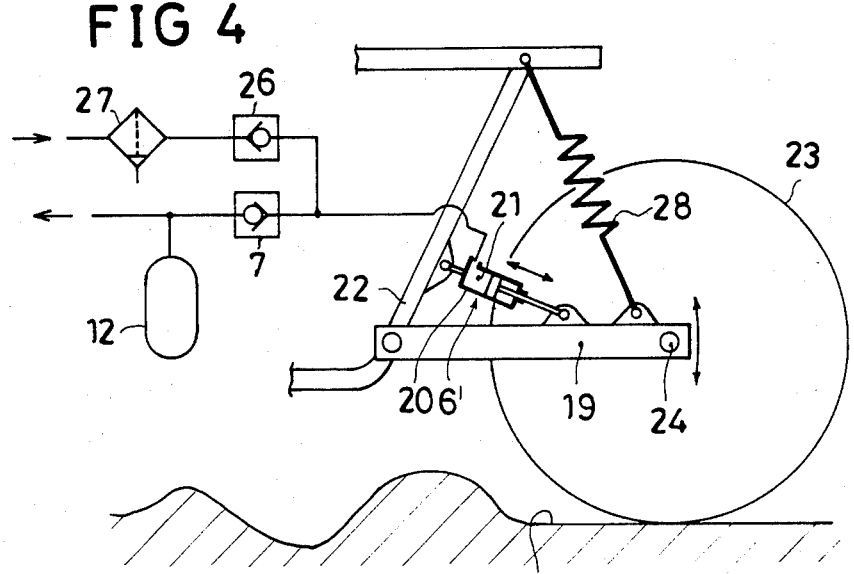
FIGS. 4 to 6 are diagrams of different embodiments of a pressure source of the present invention.

FIG. 4 shows one embodiment of an air compressor of the present invention, wherein a swingable member 19 is coupled to an air cylinder 20 having an internal air chamber 21. The swingable member 19 extends between a vehicle frame 22 of the vehicle and a wheel axle 24 of a rear wheel 23 on rear of the frame 22. The swingable member 19 has a swinging movement upward and downward according to the uneven condition of a road surface 25. The air cylinder 20 extends between the swingable member 19 and the vehicle frame 22 so that the cylinder 20 is expanded and contracted by the swinging movement of the swingable member 19 and accordingly the air chamber 21 is changed in volume. The resultant compressed air is introduced through the check valve 7 into the air tank 12 and the control valve, and the input side of the check valve 7 is connected through a check valve 26 and an air filter 27 to the atmosphere so that the external air may be introduced into the check valve 7. A spring 28 is provided on the side of the air cylinder 20.

Figure 5:
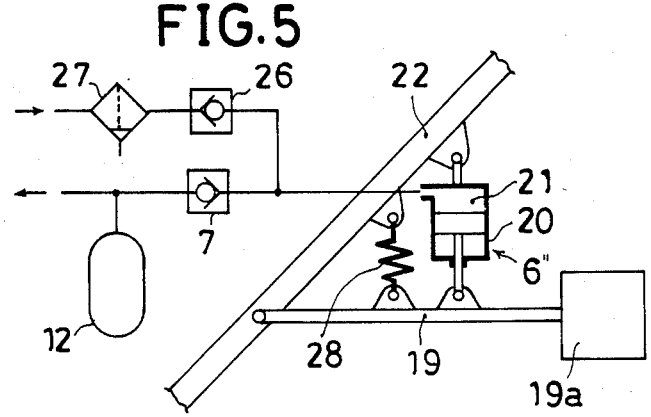

FIG. 5 shows a modified embodiment of the arrangement shown in FIG. 4. In this embodiment of the air compressor 6, the swingable member 19 extends rearwards from the vehicle frame 22 and has a weight 19a on its rear end. The air cylinder 20 is positioned on the upper side of member 19 and is connected thereto. Thus almost the same operation as in the previous embodiment is obtained.

Figure 6:
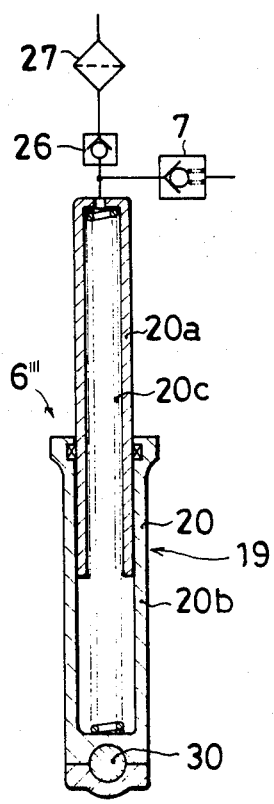

FIG. 6 shows another modified embodiment of the present invention, wherein the air compressor comprising the pressure source 6 is of the type in which a telescopic type front wheel suspension is utilized. In this case, the air cylinder 20 comprises an inner tube 20a and an outer tube 20b which are slidably mounted with respect to another, with an internal spring 20c therebetween. The air cylinder 20 is mounted on a wheel axle 30 of a front wheel 29, to function as a front wheel suspension. As a result, the outer tube 20b thereof has a swinging movement, together with the wheel axle 30, in accordance with the uneven condition of the road surface 25. Thus, the air cylinder 20 serves also as the swingable member 19, and almost the same operation as described above can be obtained.

Figure 7:
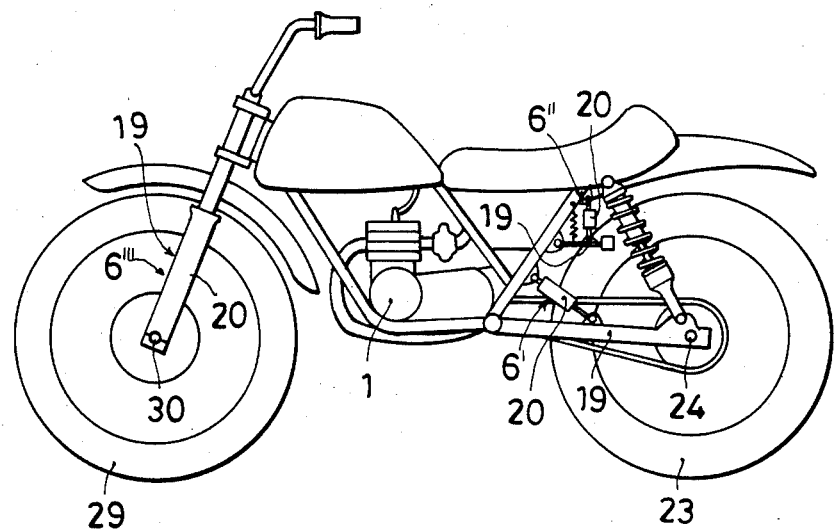
FIG. 7 is a side view of a motorized two-wheeled vehicle having the pressure sources shown in FIGS. 4 to 6.
Figure 9:
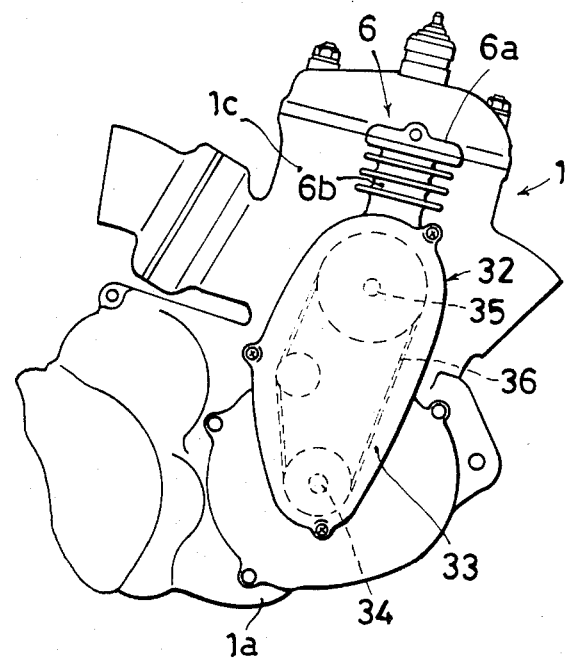
FIG. 9 is a front view thereof.

FIG. 7 is a side view of a motorized two-wheeled vehicle having three kinds of pressure sources 6', 6", 6''', that is, the pressure source 6' as shown in FIG. 4, the pressure source 6" as shown in FIG. 5 and the pressure source 6''' as shown in FIG. 6. It is not always necessary to provide all three of these pressure sources 6', 6", 6''', and it is usually sufficient to provide only one when the pressure source 6 is of the type comprising the air pump 6a driven by the engine main body 1. As mentioned above, the air pump 6a may be incorporated in the engine main body 1 as shown, for example, in FIGS.

Figure 8:
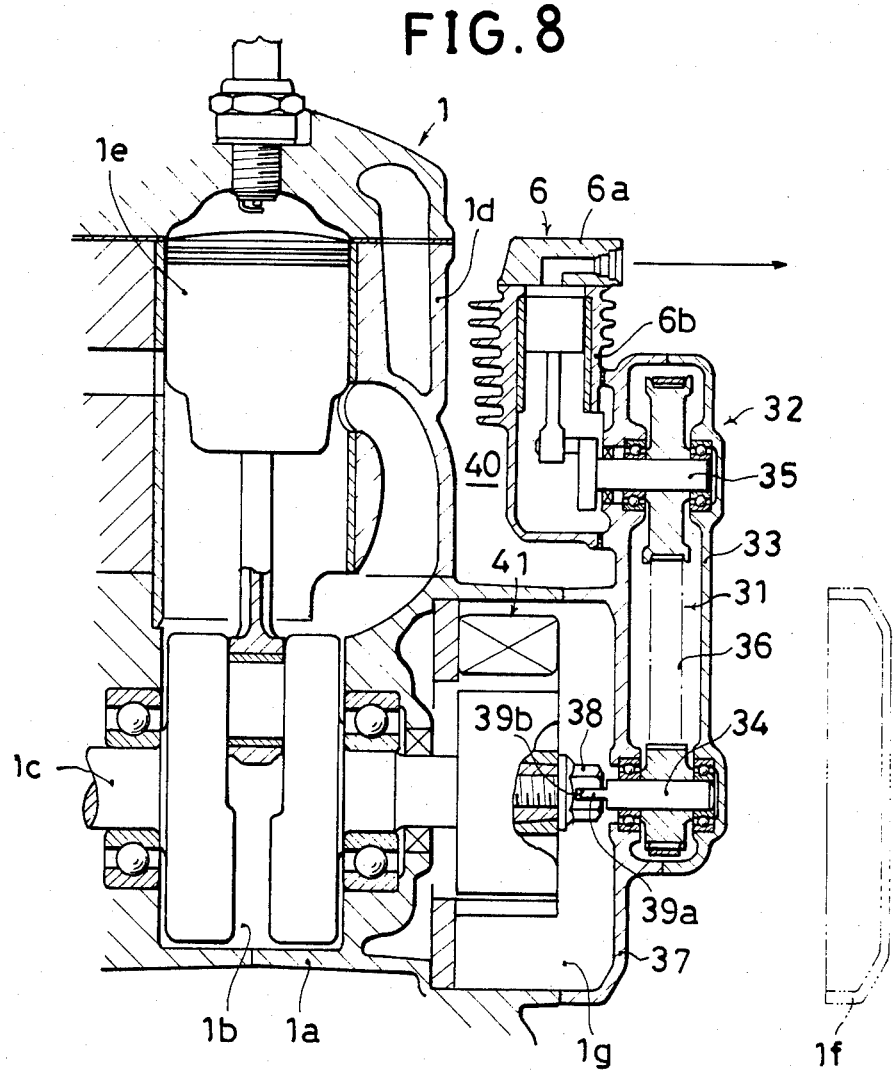
FIG. 8 is a sectional side view showing another embodiment of a pressure source of the present invention.

8 and 9. Namely, the air pump 6a and a power transmission mechanism 31 for driving the air pump be combined together to form a single unit 32, and the unit 32 is detachably mounted to a side surface of the crankcase 1a of the engine main body 1. The power transmission mechanism 31 has an outer casing 33 extending downwards from the side surface of an outer casing 6b of the air pump 6a and is provided with an input shaft 34 on the lower side, an output shaft 35 on the upper side and a connecting member 36 such as a belt, a chain, a gear train or the like coupling the two shafts 34 and 35. The resultant unit 32 is mounted, with a cover portion 37 formed on a side surface of a lower portion of the casing 33 over an opening portion 1g obtained after the conventional covering member 1f, shown in phantom lines in FIG. 8, for the side surface of the crankcase 1a, is removed. The input shaft 34 and a bolt 38 applied to an outer end portion of the crankshaft 1c are brought into engagement with one another through a projection 39a of one part and a corresponding groove 39b of the other part, and the output shaft 35 is connected to the input side of the air pump 6a. The air pump 6a is positioned in an air space 40 formed between the transmission mechanism 31 and the engine main body 1 so as not to protrude outwards. An electric generator 41 is provided on the outer end portion of the crankshaft 1c. Thus, in this embodiment, the pressure source 6 is provided on the engine main body 1, such that it is comparatively small in volume.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. An exhaust system control apparatus for an internal combustion engine, said apparatus comprising:
    (a) an exhaust passage extending from said engine;
    (b) a subsidiary chamber;
    (c) a communication passage coupling said exhaust passage and said subsidiary chamber;
    (d) an opening and closing valve positioned in said communication passage for opening and closing said passage and thereby communicating and cutting off flow between said exhaust passage and said subsidiary chamber;
    (e) pressure driven actuator means coupled to said opening and closing valve, for operating said opening and closing valve means;
    (f) pressure source means coupled to said actuator means for applying pressure to operate said actuating means;
    (g) control valve means coupled between said pressure source means and said actuator means for controlling the application of pressure to and release pressure from said actuator means; and
    (h) operating means responsive to engine speed to rapidly operate said control valve means at a predetermined engine speed to apply or release the pressure on said actuator means to inturn rapidly open said opening and closing valve when the engine speed drops to below said predetermined speed and rapidly close said opening and closing valve when the engine speed increases to above said predetermined speed.

2. An exhaust system control apparatus as set forth in claim 1 wherein the pressure source means comprises an air pump driven by said engine.

3. An exhaust system control apparatus as set forth in claim 1 wherein said pressure source means comprises the crank chamber of the crankcase of said engine.

4. An exhaust system control apparatus as set forth in claim 1 wherein said pressure source means comprises swingable means mounted on a vehicle and swingable in response to variations in a road surface as the vehicle moves along the surface, and an air cylinder having a piston coupled to said swingable means and a cylinder chamber coupled to said actuator means, wherein the volume of said cylinder chamber is varied by the swinging of said swingable means.

5. An exhaust system control apparatus as set forth in claim 4 wherein said swingable means is mounted between the frame and the rear wheel of said vehicle and said cylinder is mounted between said swingable means and the vehicle frame.

6. An exhaust system control apparatus as set forth in claim 4 wherein said swingable means has one end pivotally coupled to the frame of the vehicle, a weight on the other end thereof, and a spring means coupling a mid portion thereof to the vehicle frame.

7. An exhaust system control apparatus as set forth in claim 1 wherein said pressure source means comprise a vehicle front wheel suspension means.

8. An exhaust system control apparatus as set forth in claim 7 wherein said suspension means comprises an outer tube, an inner tube slidably mounted in said outer tube and forming a pressure chamber therebetween, spring means in said pressure chamber for biasing said inner tube with respect to said outer tube and for absorbing movement of a vehicle wheel with respect to the vehicle frame, wherein said pressure chamber is coupled to said actuator means.

9. An exhaust system control apparatus as set forth in claim 2 wherein said pump means is mounted on the engine and is coupled to the engine crankshaft.

10. The exhaust system control apparatus of claim 1 wherein said operating means includes electrical means for sensing the actual engine speed and comparator means for comparing the sensed engine speed and the said predetermined speed for causing said operation of said control valve means.

11. The exhaust system control apparatus of claim 10 wherein said electrical means includes hysteresis causing means for delaying the operation of said control valve means from one mode to the other following a preceding operation thereof as the engine speed varies near said predetermined speed.

12. An exhaust system control apparatus for an internal combustion engine with an exhaust passage, a subsidiary chamber communicating with the exhaust passage and a chamber valve for opening or closing the communication between the subsidiary chamber and the exhaust passage, the improvement comprising, an air pressure actuator means connected to the chamber valve, an air pressure source means operatively connected to said actuator, a control valve means connected between said actuator means and pressure source means for supplying pressurized air to and releasing the pressurized air from said actuator means for rapidly opening and closing the chamber valve, and operating means responsive to engine speed to rapidly operate said control valve means at a predetermined speed to inturn rapidly operate said actuator means to open the chamber valve below said predetermined speed and close the chamber valve above said predetermined speed.

* * * * *